(12) United States Patent
Tidrow et al.

(10) Patent No.: US 6,495,828 B1
(45) Date of Patent: Dec. 17, 2002

(54) FERROELECTRIC/PYROELECTRIC INFRARED DETECTOR WITH A COLOSSAL MAGNETO-RESISTIVE ELECTRODE MATERIAL AND ROCK SALT STRUCTURE AS A REMOVABLE SUBSTRATE

(75) Inventors: Steven Tidrow, Silver Spring, MD (US); Meimei Tidrow, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/550,621

(22) Filed: Apr. 17, 2000

(51) Int. Cl.$^7$ .................................................. G01J 5/12
(52) U.S. Cl. .............................. 250/338.2; 250/338.1; 250/338.3
(58) Field of Search ........................... 250/338.1, 338.2, 250/338.3

(56) References Cited

U.S. PATENT DOCUMENTS

| | | | | |
|---|---|---|---|---|
| 4,926,051 A | * | 5/1990 | Turnbull ................... | 250/338.3 |
| 5,483,067 A | * | 1/1996 | Fujii et al. ............... | 250/338.3 |
| 5,804,823 A | * | 9/1998 | Ramer et al. ............ | 250/338.2 |

OTHER PUBLICATIONS

A. Goyal, et al. "Material Characteristics Of Perovskite Manganese Oxide Thin Films For Bolometric Applications," Applied Physics Letters 71, Oct. 27, 1997, pp. 2535–2537.

Z. Trajanovic, et al. "Growth of Colossal Magnetoresistance Thin Films On Silicon," Applied Physics Letters 69, Aug. 12, 1998, pp. 1005–1007.

* cited by examiner

*Primary Examiner*—Constantine Hannaher
*Assistant Examiner*—Andrew Israel
(74) *Attorney, Agent, or Firm*—Mark D. Kelly; William V. Adams

(57) ABSTRACT

A ferroelectric/pyroelectric infrared detector includes a lattice matched substrate material and a colossal magneto-resistive electrode material. In a second embodiment, the ferroelectric/pyroelectric detector includes a colossal magneto-resistive template material to accommodate the use of a non-lattice matched substrate material, and a colossal magneto-resistive electrode material. The embodiments of the present invention provide a semi-transparent electrode material of the requisite lattice constant value, crystal orientation, and chemical compatibility. Additional advantages associated with the invention include the ability to provide the desired resistance behavior by varying the composition of the colossal magneto-resistive material, the ability to tune the colossal magneto-resistive transition temperature to be near the device operating temperature through appropriate selection of materials and process conditions, and the ability to ensure the crystal oriented growth of the ferroelectric/pyroelectric thin film. By selecting an appropriate colossal magneto-resistive electrode material, the performance of the ferroelectric/pyroelectric detector can be improved over that associated with the use of conventional electrodes such as "normal" metals or metal oxides.

7 Claims, 3 Drawing Sheets

FERROELECTRIC/PYROELECTRIC INFRARED DETECTOR WITH A COLOSSAL MAGNETO-RESISTIVE ELECTRODE MATERIAL AND ROCK SALT STRUCTURE AS A REMOVABLE SUBSTRATE

The invention described herein may be manufactured, used, and licensed by the U.S. Government for governmental purposes without the payment of any royalties thereon.

BACKGROUND OF THE INVENTION

1. Field of the Invention

This invention relates generally to uncooled infrared detectors and focal plane arrays, and more specifically to a ferroelectric/pyroelectric infrared detector. The invention relates even more specifically to a ferroelectric/pyroelectric infrared detector comprising a colossal magneto-resistive electrode material.

2. Description of Related Art

Uncooled infrared thermal detectors have recently been developed into a large-size focal plane arrays (hereinafter "FPA"). For ferroelectric ("FE") and pyroelectric ("PE") infrared detectors, the detector structures are capacitors, in which the FE or PE ("FE/PE") thin film is disposed between top and bottom thin electrode layers.

In one type of detector, the FE/PE thin film is disposed between a reflective bottom electrode and a semi-transparent top electrode. In this type of detector, the resonance of the absorption occurs within the detector structure itself. In a second type of detector, the FE/PE thin film is disposed between a transparent bottom electrode and a semi-transparent top electrode. In this type of detector, the resonance of the absorption occurs in the cavity between the detector structure and the reflecting layer of the readout integrated circuit ("ROIC").

Because the resonant cavities facilitate multi-pass absorption, the properties of the electrode are important to the FE/PE detector quality and performance. The electrode layer must be semi-transparent, so that part of the light can pass through to allow multi-pass absorption, and the sheet resistance must be within a specific range in order to maximize the infrared resonance absorption. Other important considerations include the value of the electrode material's lattice constant, the crystal orientation of the material, and the chemical compatibility of the material with both the remainder of the detector structure and the processing steps.

While conventional electrode materials satisfy some of the aforementioned criteria for FE/PE detectors, no completely suitable electrode material has heretofore existed. For example, in a common practice, "normal" metals, such as Pt, have been employed. Pt, however, not only is not semi-transparent, but is highly reflective. In addition, with Pt, the formation of helices at the deposition temperatures required for growth of the crystalline FE/PE films causes further complications for the growth of oriented films. Other conventional materials that have been studied for use as the electrode material are some metal oxides such as, La-Sr-Co-Oxide ("LSCO").

Though not heretofore considered for use as electrode materials, the use of colossal magneto-resistive ("CMR") materials for uncooled infrared detectors is described in Goyal et al., A., "Material Characteristics of Perovskite Manganese Oxide Thin Films for Bolometric Applications," *Applied Physics Letters,* Vol. 71 (17) (Oct. 27, 1997), pp. 2535–2537. CMR materials demonstrate an exceptionally large change in resistance with temperature as they transition from a ferromagnetic to a non-ferromagnetic phase. The transition temperature can be adjusted through appropriate selection of materials and process conditions. For example, at the transition temperature, CMR materials exhibit a high temperature coefficient of resistance with adequate resistance for an ROIC impedance match. When the temperature increases to room temperature, however, the resistance of the CMR material is very small. The results have demonstrated the feasibility of growing CMR thin films on perovskite oxide material substrates such as $LaAlO_3$ and $SrTiO_3$ with a resultant temperature coefficient of resistance of greater than 7%.

CMR materials have a perovskite crystal structure with a square base. The lattice constant "$\alpha$" of the square base of a CMR material is approximately 3.8 to 3.9 Å depending on the material composition. As indicated above, CMR thin films have been successfully grown on perovskite oxide substrates such as $LaAlO_3$ and $SrTiO_3$, and exhibit a good crystal orientation and a high temperature coefficient of resistance. These perovskite oxide substrate materials are employed because of the correspondence of their crystal structure and lattice constant to those of CMR materials. For example, $SrTiO_3$ has a cubic crystal structure with a lattice constant of 3.905 Å, and $LaAlO_3$ has a pseudo-cubic crystal structure with a lattice constant of 3.79 Å. These properties facilitate the growth of a CMR material on $LaAlO_3$ and $SrTiO_3$ with a resultant high crystal orientation and quality.

A general need exists to provide an uncooled ferroelectric/pyroelectric infrared detector which includes a semi-transparent electrode material. An even more specific need exists to provide an electrode material that satisfies the aforementioned lattice constant, crystal orientation, and chemical compatibility requirements.

SUMMARY OF THE INVENTION

It is an object of the present invention to provide an uncooled ferroelectric/pyroelectric infrared detector which comprises a semi-transparent electrode material. It is a further object of the present invention to provide a semi-transparent electrode material of the requisite lattice constant value, crystal orientation, and chemical compatibility.

Accordingly, in a first preferred embodiment, the present invention advantageously relates to a ferroelectric/pyroelectric detector comprising a lattice matched substrate material and a colossal magneto-resistive electrode material.

By using either a rock salt structure material such as, for example, NaCl, LiF, NaF, KF, or KCl, or a solid solution of $LaAlO_3$ and $Sr_2AlTaO_6$, as the substrate, a high quality epitaxial CMR material with a high temperature coefficient of resistance can be fabricated.

In a second preferred embodiment, the present invention relates to a ferroelectric/pyroelectric detector comprising a non-lattice matched substrate material, a colossal magneto-resistive template material, and a colossal magneto-resistive electrode material.

By employing a colossal magneto-resistive material as the electrode material, each of the aforementioned electrode material requirements is satisfied. Additional advantages associated with the present invention, however, are also realized. First, a CMR material provides the added benefit that through control of the composition, growth conditions, and film thickness, the sheet resistance of the material can be varied as needed in order to optimize the resonant structure. By varying the composition of a CMR material, the properties of the material can be modified so as to provide a resistance behavior that improves the performance of the uncooled infrared detector. Secondly, a CMR material demonstrates exceptionally large changes in resistance with temperature as it transitions from a ferromagnetic to a non-ferromagnetic phase. Because the transition temperature can be adjusted through appropriate selection of materials, composition, and process conditions, the CMR transition temperature can be "tuned" so as to be close to the operating temperature of the device.

Thirdly, because many of the most important FE/PE materials have the same perovskite structure and similar lattice constant as the CMR materials, use of a crystal oriented CMR material as an electrode and/or a template layer can ensure the crystal oriented growth of the FE/PE thin film.

Thus, by selecting an appropriate CMR material, the performance of the FE/PE detector can be improved over that associated with either "normal" metal electrodes or metal oxide electrodes such as LSCO. Hence, CMR electrode materials provide significant advantages which can result in an improvement in the overall performance of the FE/PE infrared detector, and thus the FPA.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof.

As indicated above, the resistance of a CMR material at room temperature can be very small, depending on the composition and growth condition. Although this property renders the CMR material unsuitable for use in an application such as a resistive microbolometer, the same property enables the CMR material to be perfectly suited for use as an electrode for FE/PE infrared detectors. By choosing an appropriate CMR material, the performance of the FE/PE detector can be improved by adjusting the sheet resistance via CMR composition over that of both "normal" metals and metal oxide electrodes such as LSCO. A CMR material provides the added benefit that through control of the composition, growth conditions, and film thickness, the sheet resistance of the material can be varied as needed in order to optimize the resonant structure. By varying the composition of a CMR material, the properties of the material can be modified so as to provide a resistance behavior that improves the performance of the uncooled infrared detector. Hence, CMR materials provide significant advantages which can result in an improvement in the overall performance of the FE/PE infrared detector, and thus the FPA.

To facilitate the growth of materials with the desired crystal orientation for use in infrared detectors, a basic epitaxial relation and lattice match should exist between the substrate material and the CMR material. Rock salt structure materials, for example, have cubic crystal structures with lattice constants suitable for the growth of such CMR materials. CMR materials have perovskite structures with an a and a b lattice constant of approximately 3.8 to 3.9 Å. Rock salt has a cubic crystal structure. LiF has a lattice constant $\alpha=4.02$ Å, which matches CMR material very well, with only slight tensile strain. NaCl has a lattice constant $\alpha=5.64$ Å, hence, to match the lattice constant, CMR materials may be grown epitaxially, but with slight tensile strain along the <110> direction of the NaCl. KF has a lattice constant a =5.34758 Å, hence, to match the lattice constant, CMR materials may be grown epitaxially, but with slight compressive strain along the <110> direction of the KF.

Therefore, when a rock salt structure material is used as a substrate, CMR materials can be grown directly on such a substrate. Other suitable lattice matched materials include solid solutions such as that between $LaAlO_3$ and $Sr_2AlTaO_6$.

Figure 1:
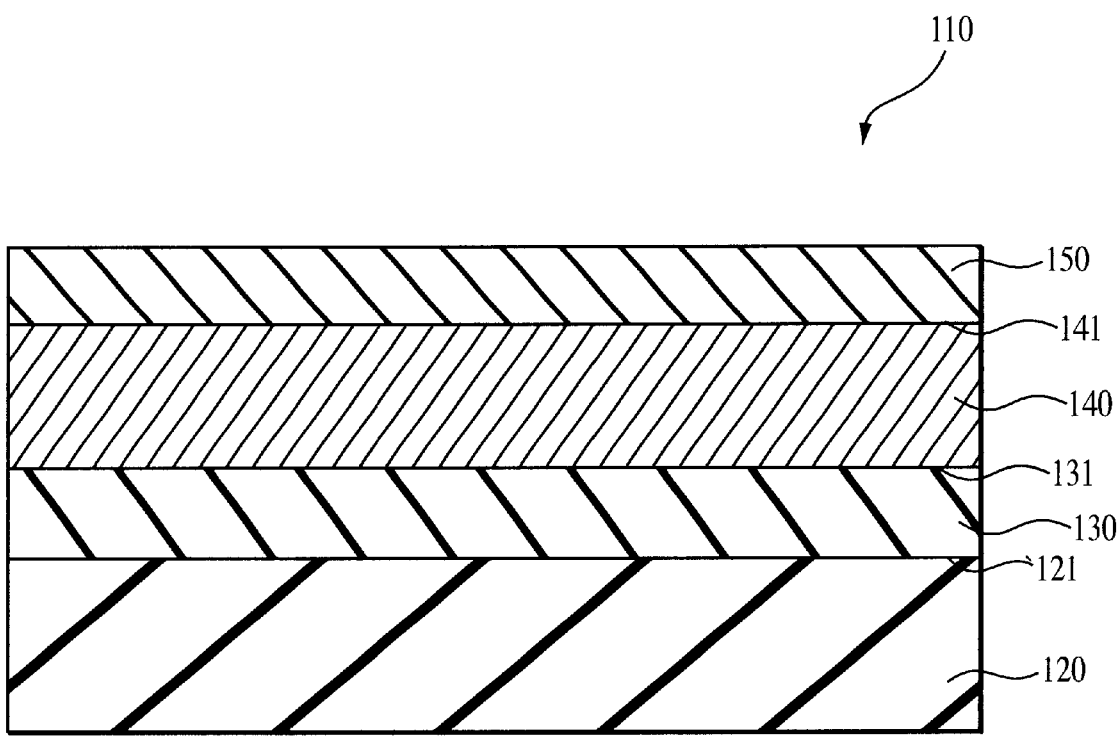
FIG. 1 is a schematic representation of a detector constructed in accordance with a first preferred embodiment of the invention.

FIG. 1 is a schematic representation of a thin-film ferroelectric/pyroelectric infrared detector 110 constructed in accordance with a first preferred embodiment of the invention comprising a lattice matched material as a substrate. Detector 110 comprises a substrate layer 120; a first colossal magneto-resistive electrode layer 130 disposed on a deposition surface 121 of substrate layer 120; a thin-film ferroelectric/pyroelectric material layer 140 disposed on a deposition surface 131 of first colossal magneto-resistive electrode layer 130; and a second colossal magneto-resistive electrode layer 150 disposed on a deposition surface 141 of thin-film ferroelectric/pyroelectric material layer 140.

In the first preferred embodiment, substrate layer 120 comprises a lattice matched substrate material. In one embodiment, this lattice matched substrate material can be either rock salt (i.e., NaCl) or a material having the structure of rock salt such as, for example, LiF, NaF, KF, or KCl. In a preferred embodiment, LiF is employed as the rock salt structure material. In another embodiment, the lattice matched substrate material is a solid solution such as that between $LaAlO_3$ and $Sr_2AlTaO_6$.

Figure 2:
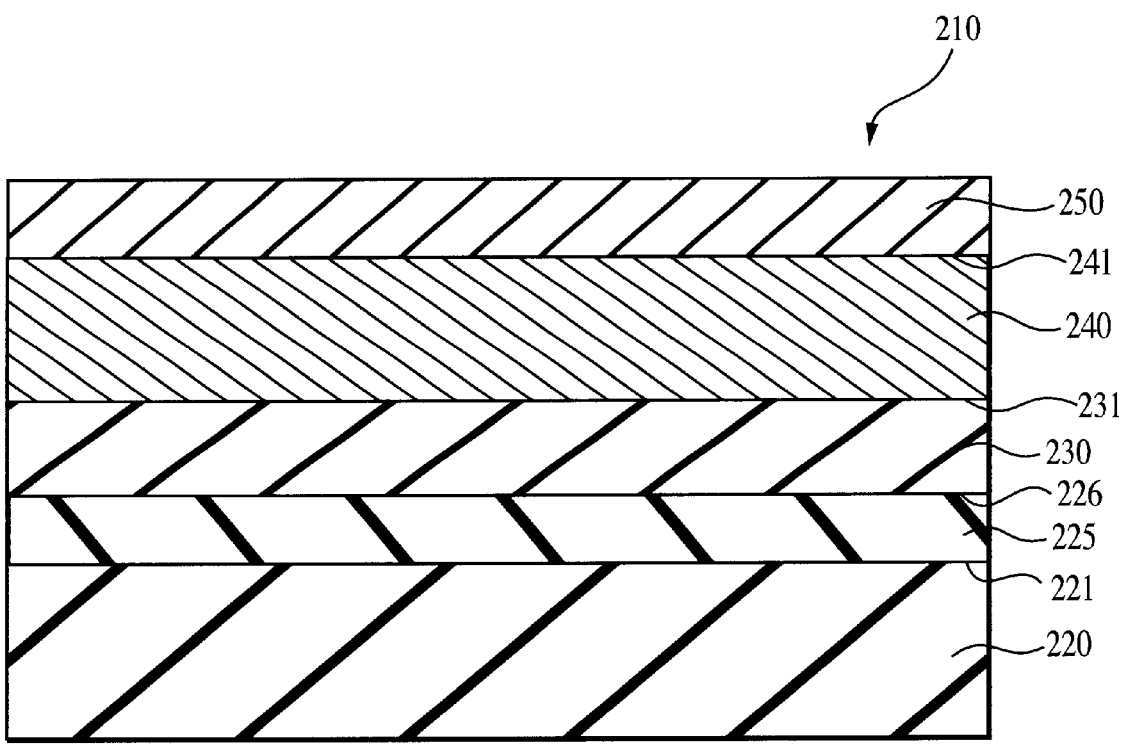
FIG. 2 is a schematic representation of a detector constructed in accordance with a second preferred embodiment of the invention.

First colossal magneto-resistive electrode layer 130 and second colossal magneto-resistive electrode layer 150 each comprise a colossal magneto-resistive material, such as, for example, a metal oxide of general formula $La_{1-x}Ca_xMnO_3$. FIG. 2 is a schematic representation of a detector 210 constructed in accordance with a second preferred embodiment of the invention comprising a non-lattice matched material as the substrate. In this embodiment, inclusion of a lattice matched buffer or template layer is necessary to facilitate crystallographically oriented growth of the first colossal magneto-resistive electrode layer. Detector 210 comprises a substrate layer 220 comprising a non-lattice matched substrate material; a template layer 225 disposed on a deposition surface 221 of substrate layer 220; a first colossal magneto-resistive electrode layer 230 disposed on a deposition surface 226 of template layer 225; a thin-film ferroelectric/pyroelectric material layer 240 disposed on a deposition surface 231 of first colossal magneto-resistive electrode layer 230; and a second colossal magneto-resistive electrode layer 250 disposed on a deposition surface 241 of thin-film ferroelectric/pyroelectric material layer 240.

In the second preferred embodiment, template layer 225 comprises a colossal magneto-resistive template material.

A CMR material provides the added benefit that through control of the composition, growth conditions, and film thickness, the sheet resistance of the material can be varied as needed in order to optimize the resonant structure. By varying the composition of a CMR material, the properties of the material can be modified so as to provide a resistance behavior which improves the performance of the uncooled infrared detector.

Figure 3:
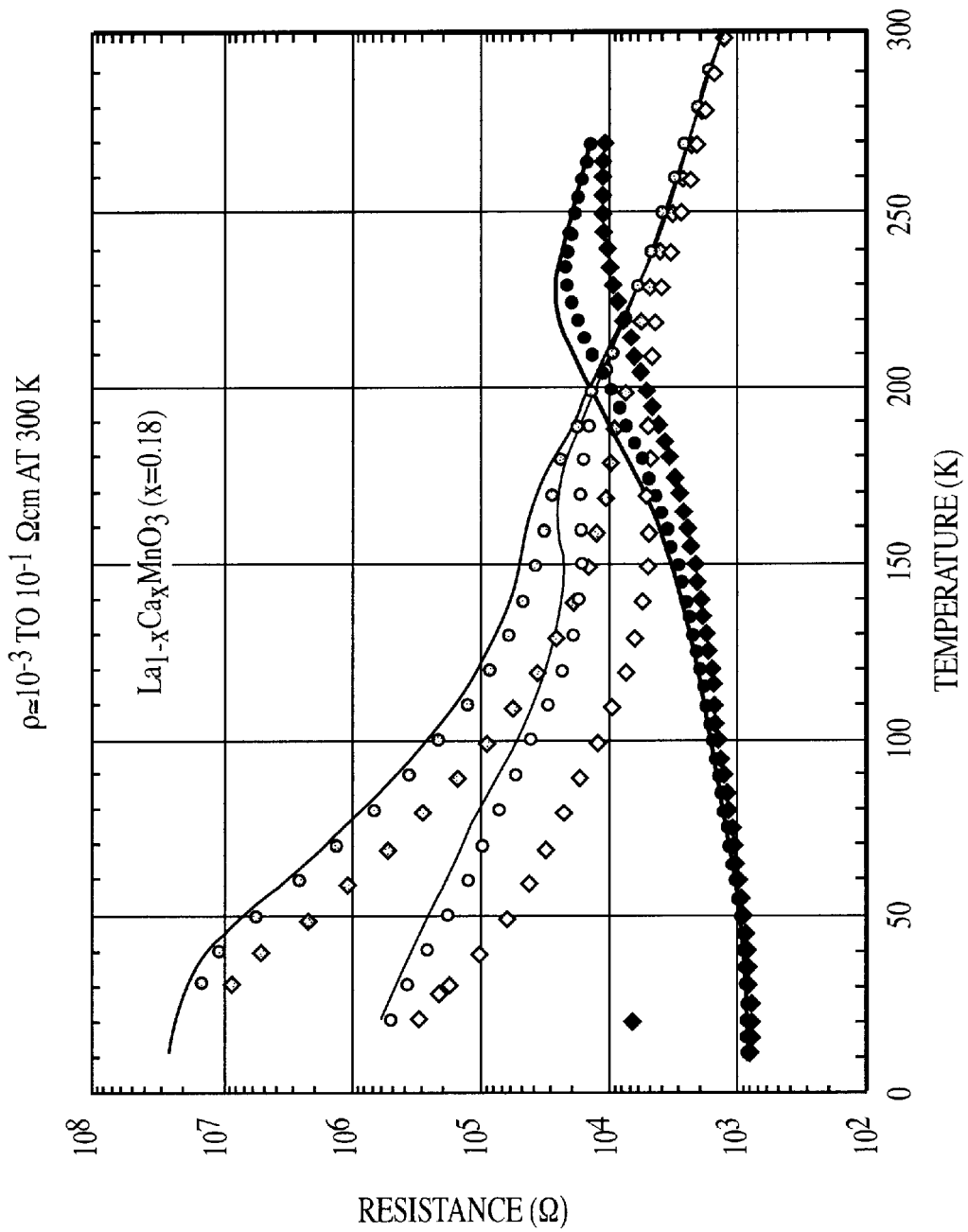
FIG. 3 is a graphical representation of the magneto-resistive behavior of a CMR material.

EXAMPLE FIG. 3 is a graphical representation of the magneto-resistive behavior of a CMR material having the general formula $La_{1-x}Ca_xMnO_3$ which was grown on a lattice matched substrate comprising a solid solution between $LaAlO_3$ and $Sr_2AlTaO_6$. With the value of x=0.18, the CMR material exhibited an appropriate resistivity at 300K for use as an electrode for an FE/PE infrared detector. By varying the composition, (i.e., the value of "x") in such a CMR material, the properties of the CMR can be modified so as to provide a resistance behavior which improves the performance of the uncooled infrared detector.

As indicated above, CMR materials demonstrate exceptionally large changes in resistance with temperature as they transition from a ferromagnetic to a non-ferromagnetic phase. The transition temperature can be adjusted through appropriate selection of materials and process conditions. By controlling the CMR composition, the CMR transition temperature can be tuned to be near the operating temperature of the device. Near the CMR transition temperature, a significant decrease in the resistance of a CMR material can be expected when the material is heated.

As shown in FIG. 3, even when the FE/PE detector is not at the CMR transition temperature, there is still a relatively large resistivity change with temperature. Hence, when the sensing structure is heated by infrared radiation, the electrode will have a much lower resistance, and thus a larger current is induced and is measured as the signal. Since the infrared resonance of absorption is a broad band of from 8 to 12 μm, this change of resistance in the CMR material does not significantly affect the resonant absorption. Instead, the use of the CMR electrode material adds an extra signal response to the pyroelectric effect, thus contributing to an overall improvement in device performance. The reduced resistance of the CMR electrode material may also be associated with an increased thermal conductivity, which allows a faster heat dissipation, thus giving the detector a faster response time. As indicated above, CMR materials have perovskite crystal structures with a square base. The lattice constant of the square base of CMR materials is approximately 3.8 to 3.9 Å depending on the material composition. Many of the most important FE/PE materials also have the perovskite structure and have a lattice constant of approximately 3.9 Å. Using crystal oriented CMR materials as an electrode and/or a template layer can ensure the crystal oriented growth of the FE/PE thin film. Such crystallographically oriented FE/PE films can improve the value of the PE coefficient by as much as a factor of three.

The embodiments of the present invention, therefore, provide a semi-transparent electrode material of the requisite lattice constant value, crystal orientation, and chemical compatibility. Advantages associated with the invention include the ability to provide the desired resistance behavior by varying the composition of the CMR material, the ability to tune the CMR transition temperature to be near the device operating temperature through appropriate selection of materials and process conditions, and the ability to ensure the crystal oriented growth of the FE/PE thin film.

While only certain preferred embodiments of this invention have been shown and described by way of illustration, many modifications will occur to those skilled in the art. It is, therefore, desired that it be understood that it is intended herein to cover all such modifications that fall within the true spirit and scope of this invention.

What is claimed is:

1. A thin-film ferroelectric/pyroelectric infrared detector comprising:

a substrate layer comprising a lattice matched substrate material;

a first colossal magneto-resistive electrode layer disposed on a deposition surface of said substrate layer;

a thin-film ferroelectric/pyroelectric material layer disposed on a deposition surface of said first colossal magneto-resistive electrode layer; and a second colossal magneto-resistive electrode layer disposed on a deposition surface of said thin-film ferroelectric/pyroelectric material layer.

2. A detector according to claim 1, wherein said lattice matched substrate material comprises a rock salt structure material.

3. A detector according to claim 2, wherein said rock salt structure material is a material selected from the group consisting of NaCl, LiF, NaF, KF, and KCl.

4. A detector according to claim 1, wherein said lattice matched substrate material comprises a solid solution of $LaAlO_3$ and $Sr_2AlTaO_6$.

5. A detector according to claim 1, wherein said first and second colossal magneto-resistive electrode layers comprise a metal oxide of general formula $La_{1-x}Ca_xMnO_3$.

6. A thin-film ferroelectric/pyroelectric infrared detector comprising:

a substrate layer comprising a non-lattice matched substrate material;

a template and buffer layer material disposed on a deposition surface of said substrate layer;

a first colossal magneto-resistive electrode layer disposed on a deposition surface of said template layer;

a thin-film ferroelectric/pyroelectric material layer disposed on a deposition surface of said first colossal magneto-resistive electrode layer; and a second colossal magneto-resistive electrode layer disposed on a deposition surface of said thin-film ferroelectric/pyroelectric material layer.

7. A detector according to claim 6, wherein said first and second colossal magneto-resistive electrode layers comprise a metal oxide of general formula $La_{1-x}Ca_xMnO_3$.

* * * * *